United States Patent [19]

Kajimura et al.

[11] Patent Number: 5,141,319
[45] Date of Patent: Aug. 25, 1992

[54] DISPLACEMENT DETECTION DEVICE WITH ADJACENT SEMICONDUCTOR DIODE LASERS

[75] Inventors: Hiroshi Kajimura; Masahiko Kato, both of Tokyo, Japan

[73] Assignee: Olympus Optical Co., Ltd., Tokyo, Japan

[21] Appl. No.: 792,819

[22] Filed: Nov. 15, 1991

[30] Foreign Application Priority Data

Nov. 22, 1990 [JP] Japan .................. 2-318957

[51] Int. Cl.⁵ .............................................. G01D 9/02
[52] U.S. Cl. .................................... 356/358; 356/352; 372/43
[58] Field of Search ............... 356/358, 352, 349, 360, 356/400; 372/43, 29; 250/306

[56] References Cited

U.S. PATENT DOCUMENTS 4,452,533 6/1984 Miles et al. .......................... 356/352
4,803,695 2/1989 Yamamoto et al. ................. 372/29
4,899,360 2/1990 Fujita et al. ......................... 359/188

OTHER PUBLICATIONS

J. Appl. Phys. 61 (10), May 15, 1987 "Atomic Force Microscopeforce Mapping & Profiling on a Sub 100-A Scale"; Y. Martin et al.
J. Vac. Sci. Technol. A6(2), Mar./Apr. 1988 "Atomic Force Microscopy Using Optical Interferometry" R. Erlandsson et al.
"Semiconductor Laser and Optical Integrated Circuit" Y. Suematsu et al.

Primary Examiner—Samuel A. Turner
Assistant Examiner—Richard E. Kurtz, II
Attorney, Agent, or Firm—Frishauf, Holtz, Goodman & Woodward

[57] ABSTRACT

A displacement detection device has a laser unit. The laser unit has two semiconductor lasers formed on a single substrate through a single process. One of the lasers has an end coated with a reflection preventing film and facing a mirror provided at the end of a cantilever. The other end of the laser is coated with a film having a high reflectance film such that a light resonator is formed together with the mirror and the high reflectance film. The other laser has both opposite ends coated with films of a high reflectance, and a light resonator is formed between the opposite ends. Two laser beams emitted from the two semiconductor lasers interfere with each other, and the resultant interference light enters the light detector. The detector detects a variation in the interference light caused by displacement of the mirror, and outputs a signal indicative of a displacement in the cantilever.

4 Claims, 3 Drawing Sheets

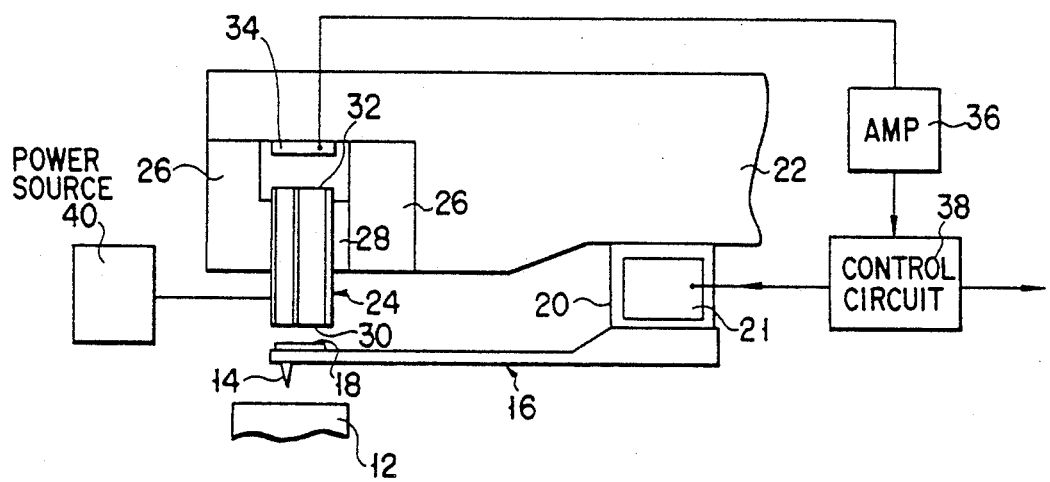
F I G. 1
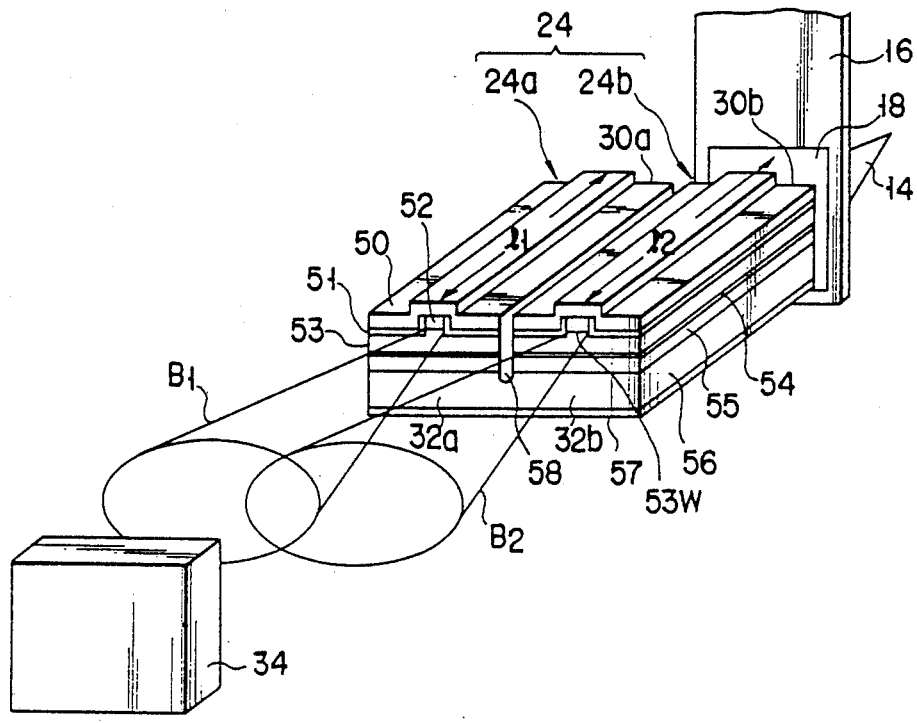
F I G. 2

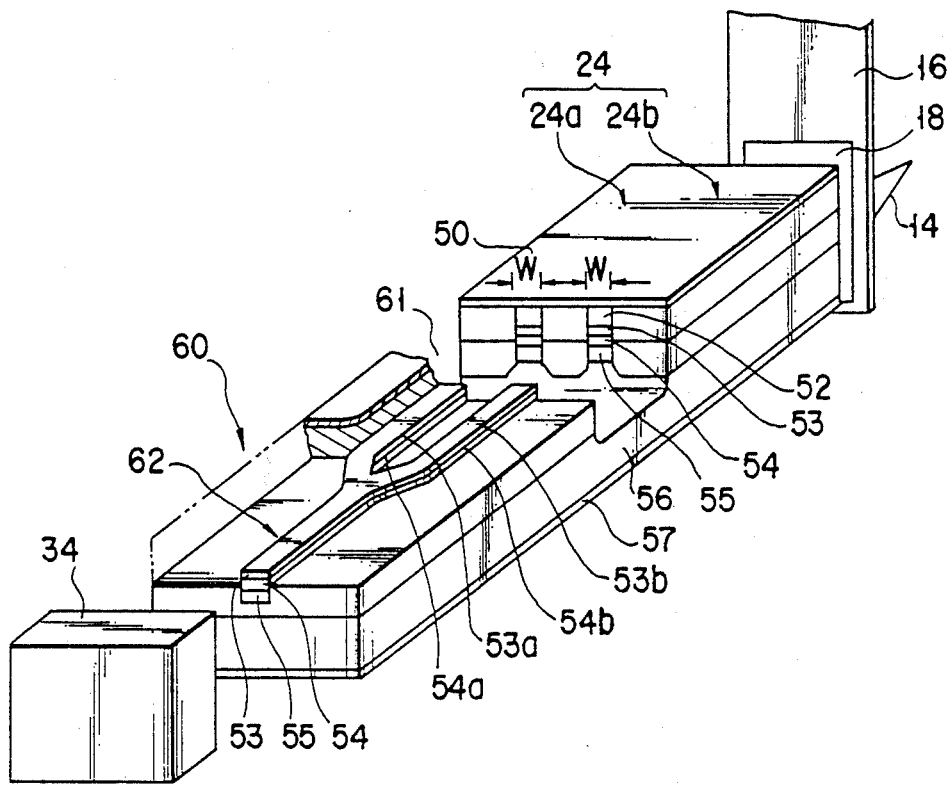
F I G. 4
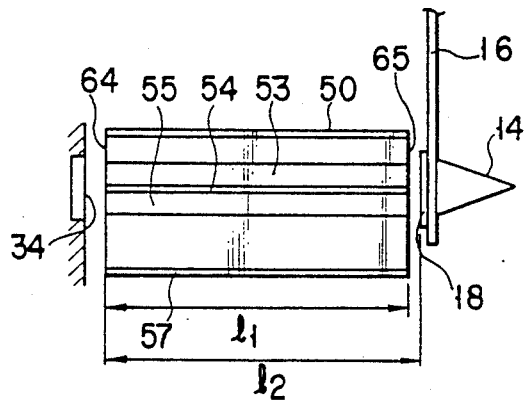
F I G. 5

DISPLACEMENT DETECTION DEVICE WITH ADJACENT SEMICONDUCTOR DIODE LASERS

BACKGROUND OF THE INVENTION

1. Field of the Invention

This invention relates to a displacement detection device, and in particular to a detection device for detecting displacement of a cantilever, which is employed in a Scanning Force Microscope (SFM).

2. Description of the Related Art

An Atomic Force Microscope (AFM) and a Magnetic Force Microscope (MFM) derived from a Scanning Tunnel Microscope (STM) are known as the Scanning Force Microscope.

The STM is well known as a device for observing the fine surface structure of a sample by using tunnel current. In the device, when a probe having its tip sufficiently pointed is moved toward the sample, electron clouds formed of an atom at the tip of the probe and of a atom at the surface of the sample become superposed on each other. At this time, if the probe and sample are electrically conductive, and a bias voltage is applied therebetween, tunnel current flows locally as a result of electron tunneling. The intensity of the tunnel current varies in accordance with the distance between the probe and sample. If the distance is approx. 1 nm, the intensity will vary by ten times whenever the distance varies by 0.1 nm.

On the other hand, in the AFM or MFM as a scanning force microscope, the detection device employed, which uses an elastically deformable member such as a cantilever, detects fine interactive forces acting upon atoms at the tip of a probe and at the surface of a sample and depending upon the distance between the atoms, i.e. a van der Waals force, a coulombic force, a frictional force, an absorbing force, a magnetic force, etc. In other words, the STM, AFM, and MFM detect an interactive force created between an atom at the tip of the probe and an atom at that part of the surface of the sample which is located in the vicinity of the probe tip. Thus, the structure of the surface of the sample is observed by means of a longitudinal resolving power determined from the distance between adjacent atoms, and a transverse resolving power determined from the degree of expansion of that atom at the probe tip which is involved in the detected interaction.

In the SFM, sample surface data of three dimensions or more can be obtained by moving the probe and sample relative to each other, thereby performing raster scan, and sampling a correlative force acting at each measuring point based on the transverse resolving power.

In the STM, in general, the servo system employed is controlled during scanning so as to keep the tunnel current or distance between a probe and a sample at a constant value, and servo outputs and measuring point data are displayed in a synchronous manner, thereby obtaining a three-dimensional image indicative of the unevenness of the sample surface.

Also in the AFM or MFM, the servo system is controlled during scanning so as to keep the force, acting upon the cantilever, at a constant value, and servo outputs and measuring point data are displayed in a synchronous manner, thereby obtaining a three-dimensional image indicative of the sample surface. In this case also, the three dimensional image indicates the configuration of the sample surface, if the sample contains a single kind of atoms, since the image is based on the distance between the probe and sample.

In the above SFMs, however, it is necessary to vary the material of the probe and/or the curvature of the tip of the probe in accordance with a sample to be measured. Specifically, the magnitude and direction of the force acting between an atom T of the probe and an atom S of the sample, vary in accordance with the distance therebetween and with the kinds of the atoms.

As regards the atom S of the sample, the magnitude and direction of the force vary in the following cases: a case where the sample consists of one kind of atoms, i.e., it is made of, for example, graphite or silicon crystal; a case where the sample consists of a plurality of kinds of atoms, i.e., it is made of, for example, a III-V compound having a crystalline structure of gallium (Ga) and phosphorus (P); a case where the sample is made by doping an impurity into silicon crystal or GaP crystal; a case where a defective has grown in crystal structure; a case where phase shift has occurred in structure; and a case where the state of the sample surface has varied in accordance with a change in temperature.

On the other hand, as regards the probe, if the distance between the probe tip and sample is a few tens nm, a plurality of atoms T of the tip will act upon a plurality of atoms S of the sample, even when the curvature of the tip is small. In a case where an adsorption material (e.g. oxygen) is attached to the tip of the probe, the combination of atoms is varied, resulting in a change in interactive force.

It is known that servo control to keep the interactive force at a constant value is effective in the case of using a cantilever as detection means for detecting various sample structures. However, if a given point of the sample is measured under the servo control, it is necessary to judge which force is exerted in accordance with the position of the probe, and to select a cantilever having an elastic force suitable for measuring the force under the condition. In general, a cantilever can have a desired elastic characteristic by changing its shape without changing its material. To detect the total force of various elements as described above means to detect, for example, that displacement of a cantilever which reflects a structure more complex and finer than a simple crystal structure, such as graphite or silicon crystal, which has been detected by the conventional STM or AFM.

Further, a cantilever for use in the AFM or MFM is preferably formed thin, long, and narrow, by using a material being as light as possible and having a large elastic coefficient, so that it could be greatly displaced by a fine force (interatomic force or magnetic force). However, a long cantilever inevitably has a low natural frequency, resulting in deteriorated responsiveness in scanning the unevenness of the sample. Moreover, it is difficult to eliminate noise due to external vibration. To avoid these, G. Bennig of IBM and C. F. Quate of Stanford University recommended forming of a cantilever of Si by lithography, deposition, etching, as well as an Integrated Circuit process. At present, a cantilever having a length of 100-200 $\mu$m, a width of 10-40 $\mu$m and a thickness of 0.3-0.6 $\mu$m is available, and its eigenfrequency is 10-70 kHz and its force sensitivity is 0.004-0.04 N/m.

There is a method for detecting a displacement in the above-described cantilever. In the method, an STM is formed opposed to the reverse side of the cantilever (i.e., the side having no probe), and a displacement in the cantilever is detected based on a variation in tunnel current. Though the STM has a sufficient sensitivity for the distance between the probe and cantilever, accurate measurement still cannot be performed since an interatomic force exists even therebetween.

In another method, a light reflecting surface is provided on the reverse side of a tip portion of a cantilever, and a laser beam is reflected on the surface, thereby detecting, by a PSD (position sensitive device) a reflection angle varying in accordance with a displacement in the cantilever. In this method, however, if the incident angle of a beam is increased to enhance the sensitivity of the device, or if the distance between the cantilever and detector is increased in an optical lever method to enhance the same, the device must be made larger, so that its eigenfrequency will inevitably be reduced, and the detection accuracy will contrary be reduced.

In a furthermore method of this kind, light emitted from a laser is divided into two light beams, i.e., a reference beam and a detection beam, and the detection beam is irradiated onto an optical reflecting mirror provided on the reverse side of a tip portion of a cantilever, thereby making the beams interfere with each other and detecting the resultant coherent light. To obtain a good sensitivity, the light passage of a reference light system must have the same length as that of a detection light system so as to eliminate the influence of the ambient factors such as temperature and pressure, which makes the device complex. Further, if the reference light system is provided apart from the detection light system, it will be very difficult to equalize the eigenfrequency of their respective light passages to each other, resulting in a reduction in sensitivity due to the influence of the ambient factors.

The above-described detection devices must be made large and heavy, and hence have the disadvantage that detection signals may be buried in external noises even if the device has a high detection accuracy by virtue of employment of a fine cantilever.

SUMMARY OF THE INVENTION

It is the object of the invention to provide a displacement detection device of a small size.

Additional objects and advantages of the invention will be set forth in the description which follows, and in part will be obvious from the description, or may be learned by practice of the invention. The objects and advantages of the invention may be realized and obtained by mean of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a scanning force microscope incorporating a displacement detection device of the invention;

FIG. 2 shows a displacement detection device according to a first embodiment of the invention;

FIG. 4 shows a displacement detection device according to a second embodiment of the invention; and FIG. 5 shows a displacement detection device according to a third embodiment of the invention.

DETAILED DESCRIPTION OF THE PREFERRED EMBODIMENTS

Figure 3A:
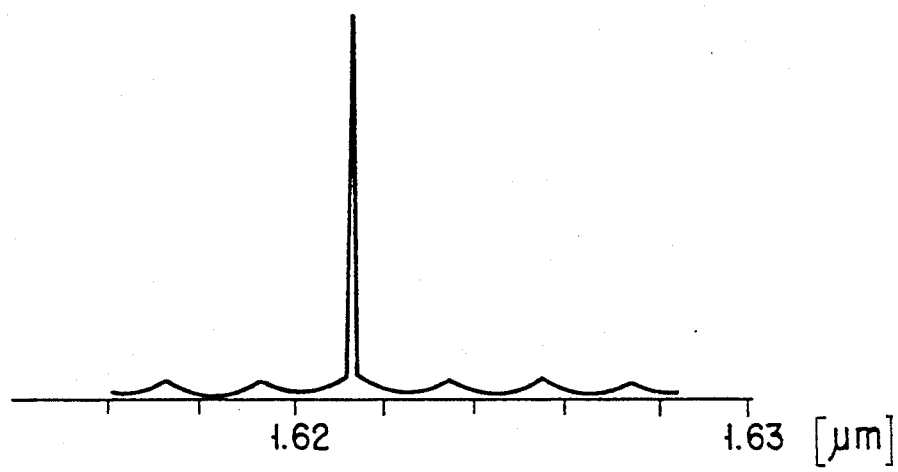
FIG. 3A shows the oscillation spectrum of a single mode laser

A displacement detection device for detecting displacement of a cantilever employed in a scanning force microscope, which accords to a first embodiment of the invention, will be explained with reference to the drawings.

As is shown in FIG. 1, the scanning force microscope has a cantilever 16 having a probe 14 at a free end portion for scanning the surface of a sample 12. The cantilever 16 has a lever having a length of 50-2000 $\mu m$, a thickness of 0.2-5 $\mu m$, and a width of 10-200 $\mu m$ and made of $SiO_2$ (or $Si_3N_4$), and is produced by a technique called "microfabrication" based on a semiconductor processing technique. This technique corresponds to, for example, the technique described in "Kurt E. Petersen: Silicon as a Mechanical Material. Proceedings of the ITTT 70(1982)426". The cantilever 16 also has a mirror 18 formed by depositing Au or Al on the upper side of the free end portion.

The cantilever 16 has a rigid support portion to be attached to or detached from the device. The support portion may be that portion of the substrate which is not processed through the "microfabrication". Alternatively, it may be a Pyrex glass to which the cantilever 16 is anode-bonded. The support portion is secured to a piezoelectric member 20 such as PZT which is fixed to a support member 22 made of silicon or Pyrex. The piezoelectric member 20 has two electrodes 21 at the opposite sides (only one of which is shown), and move the cantilever 16 in the vertical direction in accordance with a voltage applied to the electrodes. A semiconductor laser unit 24 is provided above the mirror 18, and is supplied with power from a power source 40. The laser unit 24 has two electrodes facing each other, one of which is secured directly to a heat sink member 26 of copper or silicon, and the other is secured to the same with a silicon rubber 28 interposed therebetween. The heat sink members 26 are mounted on the support member 22.

As is shown in FIG. 2, the semiconductor laser unit 24 has two semiconductor lasers 24a and 24b formed on the same substrate through the same process. These lasers 24a and 24b preferably have a small oscillation value and a small output, and may be produced by a well known process. In the embodiment, the lasers each have a resonator with a ridged portion, are formed by laminating an $n-Al_yGa_{1-y}As$ clad layer 55, a $p-Al_xGa_{1-x}$ active layer 54 ($x<y$), a $p-Al_yGa_{1-y}As$ clad layer 53, and a p-GaAs contact layer 52 on an n-GaAs substrate 56, in the order mentioned, then forming a p-electrode 50 on the upper surface of the resultant structure with an insulation layer 51 interposed therebetween, and further forming an n-electrode 57 on the lower surface of the substrate 56. The semiconductor lasers 24a and 24b are separated from each other by a groove 58. The groove 58 is formed by reactive ion beam etching such that it extends to the substrate 56.

The laser 24a has both opposite cleavage planes 30a and 32a each coated with $Al_2O_3$ of a high reflectance such that the resonators is formed between the planes 30a and 32a. The laser 24a has both opposite cleavage planes 30b and 32b, the plane 32b is coated with $Al_2O_3$ having the same reflectance as the planes 32a, the other plane 30b facing the mirror 18 on the cantilever 16 is AR coated. Therefore, the other resonator is formed between the cleavage plane 32b and the surface of the mirror 18. Thus, the lasers 24a and 24b form Fabry-Pero resonators having lengths of $l_1$ and $l_2$, and oscillate with frequencies of $f_1$ and $f_2$, respectively. Slightly divergent elliptic laser beams $B_1$ and $B_2$ are emitted from the cleavage planes 32a and 32b, respectively. The distance between the lasers 24a and 24b is set small so that the laser beams $B_1$ and $B_2$ interfere with each other, and a detector 34 is provided in a position that the beams overlap each other.

Figure 3B:
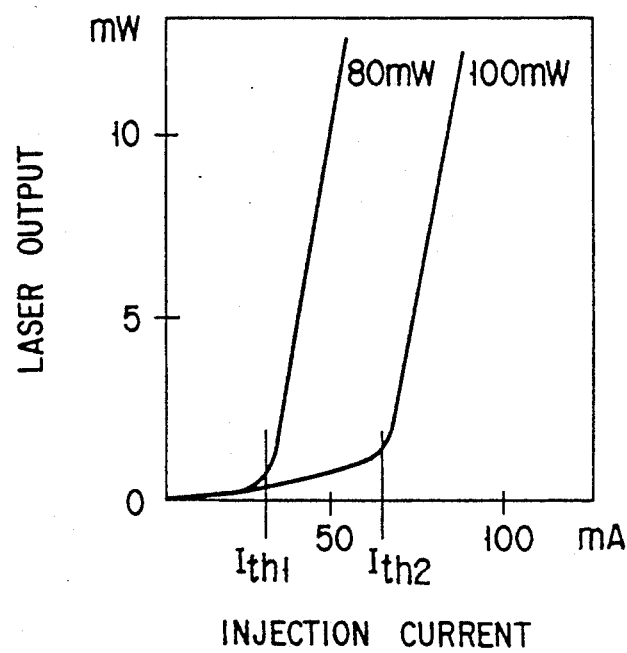
FIG. 3B shows injection current-output characteristic of a semiconductor laser.

The active layer 54 is interposed between the clad layers 53 and 55, and the lasers 24a and 24b have a ridge waveguide having a width of 53W, so that horizontal mode oscillation is suppressed. Thus, with an injection current of more than the threshold current ($I_{th1}$ or $I_{th2}$ shown in FIG. 3B) applied to the laser, the laser serves as a single mode laser which oscillates a laser beam having a spectrum as shown in FIG. 3A. In this case, the width of the spectrum is very narrow, i.e., $\frac{1}{5}-\frac{1}{8}$ of the longitudinal mode interval Al (0.3-2 nm), and accordingly the output abruptly reduces even if the wavelength is shifted by $\frac{1}{5}-\frac{1}{8}$ Angstrom.

Moreover, in a communication laser, very large injection current is consumed to obtain large output. Hence, a great amount of energy is converted to heat, as well as light, which greatly increases the temperature of the laser. In the Fabry-Pero mode, the refraction factor of light in the active layer varies in accordance with an increase in temperature, so that the wavelength varies by 0.6-0.8 Å/deg in a GaAs/AlGaAs laser, while it varies by 1.0 Å/deg in a GaInAsP/InP laser.

Since the semiconductor laser unit 24 employed in the embodiment emits a light beam to a mirror or a detector located apart therefrom by 1-1000 μm only, it comprises GaAs/AlGaAs lasers each having a small output. These lasers are formed adjacent to each other through a single process so that they can provide the same characteristic irrespective of a change in temperature, and that they can operate to eliminate the influence of the change.

As is shown in FIG. 1, the output from the detector 34 is amplified by an amplifier 36, and is input to a control circuit 38 driven by the piezoelectric member 20.

Then, the operation of the embodiment will be explained.

The semiconductor lasers 24a and 24b excited by the laser oscillation power source 40 oscillate at frequencies $f_1$ and $f_2$ peculiar to the resonator lengths $l_1$ and $l_2$, with single-mode of narrow wavelength width, respectively. Thus, laser beams $B_1$ and $B_2$ are emitted from the cleavage surfaces 32a and 32b. The detector 34 for detecting a laser beam $B_{12}$ synthesized the beams $B_1$ and $B_2$, receives a beat coherent wave of $f_{12}^- (=|f_1-f_2|)$ and $f_{12}^+ (|f_1+f_2|)$.

The $f_{12}^-$ is a low frequency which falls within the detection region of the detector 34 and is detected by the same, whereas the $f_{12}^+$, $f_1$ and $f_2$ are not detected in general.

The detection utilizing the beat coherent wave of $f_{12}^- (=|f_1-f_2|)$ is called "optical heterodyne detection", and measure a higher frequency band and hence perform a sensitized displacement detection, in particular, in a case where the laser oscillation is performed in a stable manner as in the embodiment, as compared with other methods such as a light modulation frequency subtraction method, an FM side band method, etc.

The principle of the optical heterodyne detection will be explained.

The optical frequency difference $\omega_0[=2\pi (f_1-f_2)]$ between the semiconductor lasers 24a and 24b is caused by interference between the light beams emitted therefrom. The intensity I(t) of interference is given by:

$$I(t) = I_1 + I_2 + 2\cos\theta \cdot \sqrt{I_1 I_2} \cos(\omega_0 t) \quad (1)$$

where reference codes $I_1$ and $I_2$ represent the powers of the beams of the lasers, and reference code $\theta$ represents an angle made by polarization planes of the beams. The third term represents a beat component, and assumes a maximum value with the polarization planes of the beams coincident, i.e., $\theta=0$. In the embodiment, the two semiconductor lasers 24a and 24b made by the same process and having optical waveguides of the same structure are employed, and therefore the oscillation mode of each of the lasers assumes one of the TE mode and the TM mode, whereby the angle $\theta$ is to 0.

The photoelectric current detected by the light receiver or detector 34 is given by:

$$i(t) = (e\eta/h\nu) \cdot [I_1 + I_2 + 2\cos\theta \cdot F(\omega_0) \sqrt{I_1 I_2} \cos(\omega_0 t)]$$

where reference code e represents charge of an electron, reference code $\eta$ quantum efficiency of the light receiving element, reference code hv the energy of a photon, and reference code $F(\omega_0)$ the frequency characteristic of the light receiving circuit.

The intensities $I_1$ and $I_2$ of the beams of the lasers 24a and 24b are kept at constant values by means of stable supply of current. A PIN photodiode suitable for the beat frequency is used as the light detector 34. The frequency $f_1$ of the laser 24a for reference is kept constant, while the frequency $f_2$ of the aser 24b for detection is varied in accordance with displacement of the cantilever 16 caused by atomic force. This variation depends upon a change in resonator length $l_2$ caused by the displacement of the cantilever 16. If the frequency of the laser 24b varies from $f_2$ to $(f_2+\Delta f)$, the beat signal i(t, $\Delta f$) becomes K $\cos[2\pi (f_1-f_2-\Delta f)t]$ where reference code K represents a constant obtained by summing the values e, $\eta$, hv, $I_1$, $I_2$ and $F(\omega_0)$. Thus, the beat signal depends upon displacement of the cantilever 16, which means that the displacement is detected by the beat signal. That signal indicative of a displacement in cantilever which is supplied from the amplifier 36 is used, via the control circuit 38, i) for controlling the position of the mirror 18 of the cantilever 16, i.e., the resonator length $l_2$ to a predetermined length (in e.g. an initial setting), ii) for performing servo control so as to keep at the predetermined length the resonator length $l_2$ which may be varied by an atomic force acting between the probe and sample, iii) for resonating the cantilever 16 at its resonance frequency $\omega_K$, detecting a change in resonance frequency due to the atomic force, and controlling the change, or iv) for moving, by means of a piezoelectric member (not shown), the sample 12 in the direction in which the cantilever 16 is moved, thereby controlling the interatomic force constant, and accordingly controlling the resonator length $l_2$ to the predetermined value.

FIG. 4 shows a displacement detection device according to a second embodiment of the invention. In this figure, numerals identical to those in FIG. 2 denote corresponding elements, and therefore explanation thereof is omitted.

In the second embodiment, the device comprises the laser unit 24 having baried-type semiconductor lasers 24a and 24b and a waveguide unit 60 for synthesizing light and causing interference of light, which are formed on a single substrate through a single process. Thus, the lasers are integrated with the waveguide unit. In this structure, the synthesis and interference is, unlike the first embodiment, not performed outside the lasers 24a and 24b, which facilitates the arrangement of a light receiver 34. More specifically, the second embodiment differs from the first embodiment in that the lasers are buried and formed as follows: excited light wave is closed in a p−$Al_xGa_{1-x}$ active layer 54 of a width W with transverse mode. The laser unit 24 is functionally separated from the Y-shaped waveguide unit 60 by means of a separation groove 61, which is formed by ion beam etching such that it extends to the n-GaAs substrate 56. Thus, the excitation electrode 50 of the semiconductor laser is terminated by the separation groove 61, and an n−$Al_yGa_{1-y}As$ clad layer 55, a p−$Al_xGa_{1-x}$ active layer 54 ($x<y$) and a p−$Al_yGa_{1-y}As$ clad layer 53 simply form waveguides. In the waveguide unit 60, two waveguide branch portions (comprising clad layers 53a and 53b, active layers 54a and 54b, etc.) are coupled with each other on a side close to the detector 34, forming an output line 62. That is, a Y-shaped waveguide is formed Coherent light is emitted from the end face of the output line 62, and its beat frequency is detected, as in the first embodiment, by the detector 34 arranged opposed to the output line 62

FIG. 5 shows a third embodiment of the invention.

In this embodiment, there is provided a semiconductor laser whose resonator has three reflecting mirrors to be used in place of two lasers for respectively emitting detection and reference light beams. That is, there is no laser dedicated to the reference light beam and spatially separated from a laser for the detection light beam. In this case, a mode in which double resonate wavelength peaks exist is utilized.

A reflecting mirror, on which $Al_2O_3$ is deposited and which has a high reflectance $R_1$ (60%. or more), is provided on a cleavage surface 64 perpendicular to the active layer 54 of the laser unit 24 interposed between a cantilever 16 and a detector 34, thereby preventing the surface from being deteriorated. A dielectric multi-layered film is formed on a cleavage surface 65 opposite to the surface 64. This multi-layered film is formed by alternately laminating $TiO_2$ films of a high refractive index and $SiO_2$ films of a low refractive index, and it has a reflectance of 50% or less. About a half of light reflected by the cleavage surface 64 reaches the mirror 18 of the cantilever 16 through the cleavage surface 65. As a result, two resonators (i.e. lasers) having lengths $l_1$ and $l_2$ are simultaneously formed in the laser unit 24. If the intensities of these resonators are set equal to distributed excitation currents $l_1$ and $l_2$, respectively, as in the first embodiment, the equation (1) will be satisfied. In the second and third embodiments, the light detector 34 may be a wave detector which is formed on a substrate in rear of the Y-shaped waveguide unit 60, or in rear of the semiconductor laser unit 24 in FIG. 5, such that it is integral with the semiconductor laser structure formed on the same substrate. Alternatively, the detector 34 may be a Schottky barrier diode wave detector obtained by forming an InGaAs portion in part of the AlGaAs/GaAs waveguide.

The invention is not limited to the above-described embodiments, and may be modified in various manners without departing from the scope thereof. For example, the distance between the sample 12 and probe 14 may be controlled by moving the sample, though it is done by moving the probe by use of the piezoelectric member 20 in the embodiment shown in FIG. 1.

What is claimed is:

1. A displacement detection device for detecting displacement of a cantilever comprising:
   a reflecting mirror provided on the cantilever;
   a first semiconductor laser using the reflecting mirror as a mirror for a light resonator;
   a second semiconductor laser arranged in the vicinity of the first semiconductor laser; and
   a light detector for receiving interference light of light beams emitted from the first and second semiconductor lasers, and outputting a signal indicative of a displacement in the reflecting mirror.

2. The displacement detection device according to claim 1, wherein the first and second semiconductor lasers are formed on a single substrate through a single process.

3. The displacement detection device according to claim 2, further comprising a light waveguide having two input terminals for receiving laser beams emitted from the first and second semiconductor lasers, and one output terminal for outputting the received laser beams toward the light detector.

4. A displacement detection device for detecting displacement of a cantilever comprising:
   a reflecting mirror provided on the cantilever;
   a semiconductor laser having two cleavage surfaces which are arranged in parallel with the reflecting mirror; and
   a detector for monitoring an oscillation output from the semiconductor laser;
   wherein one of the two cleavage surfaces, which is opposed to the reflecting mirror, has a reflectance smaller than that of the other of the two cleavage surfaces, such that a first resonator is formed between the two cleavage surfaces and a second resonator is formed between the reflecting mirror and the other cleavage surface.

* * * * *